United States Patent
Niida et al.

(10) Patent No.: US 10,381,961 B2
(45) Date of Patent: Aug. 13, 2019

(54) MOTOR CONTROL CIRCUIT AND MOTOR

(71) Applicant: MABUCHI MOTOR CO., LTD., Chiba (JP)

(72) Inventors: Ryo Niida, Chiba (JP); Yasuyuki Takamori, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 16/052,613

(22) Filed: Aug. 2, 2018

(65) Prior Publication Data
US 2019/0052199 A1    Feb. 14, 2019

(30) Foreign Application Priority Data
Aug. 9, 2017    (JP) .................... 2017-154502

(51) Int. Cl.
*H03K 5/00* (2006.01)
*H02P 6/15* (2016.01)
*H02P 6/26* (2016.01)

(52) U.S. Cl.
CPC ............. *H02P 6/157* (2016.02); *H02P 6/26* (2016.02)

(58) Field of Classification Search
CPC .................. H02P 6/157; H02P 6/26
USPC ........................... 318/400.13, 139
See application file for complete search history.

(56) References Cited

U.S. PATENT DOCUMENTS

| | | | | |
|---|---|---|---|---|
| 5,903,121 A | * | 5/1999 | Heine | .............. H02P 7/04 |
| | | | | 318/400.12 |
| 6,906,484 B1 | * | 6/2005 | Berroth | ............ H02P 6/085 |
| | | | | 318/292 |
| 2003/0165072 A1 | * | 9/2003 | Nadd | ............ H02M 7/003 |
| | | | | 363/147 |
| 2009/0045762 A1 | * | 2/2009 | Hayashi | ............ H02P 7/28 |
| | | | | 318/379 |
| 2014/0368138 A1 | | 12/2014 | Celik et al. | |
| 2015/0263511 A1 | * | 9/2015 | Sandner | ............ H02H 7/1252 |
| | | | | 363/53 |

FOREIGN PATENT DOCUMENTS

JP    2015-2670 A    1/2015

* cited by examiner

*Primary Examiner* — Erick D Glass
(74) *Attorney, Agent, or Firm* — Hauptman Ham, LLP

(57) ABSTRACT

A motor control circuit includes: first high and low side switches connected to one end of a drive coil of a brush-less motor, and second high and low side switches connected to the other end of the drive coil. In a first energization state, a positive drive current is supplied to the drive coil. In a second energization state, a negative drive current is supplied to the drive coil. In a first reflux state, a positive circulation current is applied to the drive coil after the first energization state. In a second reflux state, a negative circulation current is applied to the drive coil after the second energization state. A first non-energization state is between the first reflux state and the second energization state after the first reflux state, and a second non-energization state is between the second reflux state and the first energization state after the second reflux state.

7 Claims, 5 Drawing Sheets

Fig.3

| LOAD STATE | REFLUX STATE CONTINUOUS ELECTRICAL ANGLE |
|---|---|
| HIGH LOAD | a_high [°] |
| MEDIUM LOAD | a_mid [°] |
| LOW LOAD | a_low [°] |
| . . . | . . . |

MOTOR CONTROL CIRCUIT AND MOTOR

RELATED APPLICATIONS

The present application claims priority to Japanese Application Number 2017-154502 filed Aug. 9, 2017, the disclosure of which is hereby incorporated by reference herein in its entirety.

BACKGROUND

1. Technical Field

The present disclosure relates to a motor control circuit and a motor.

2. Description of the Related Art

In order to improve efficiency of a brush-less motor, inertia rotation period is provided after conduction period in some cases when controlling the brush-less motor. Current has been applied by using a parasitic diode provided to a switch in the inertia rotation period. When current is continuously applied by using a parasitic diode, loss of the brush-less motor becomes large and heat is generated from the parasitic diode. A technique is disclosed in which circulation current is applied by switching a switch provided with a parasitic diode to an ON state instead of continuously applying current by using a parasitic diode, as a method for applying circulation current in an inertia rotation period (For example, JP-A-2015-2670).

SUMMARY

However, according to the technique described in JP-A-2015-2670, torque in the reverse rotation direction (so-called minus torque) is generated by inverse electromotive force of the motor if the inertia rotation period is relatively long, and efficiency is not sufficiently improved.

An embodiment of the present disclosure is a motor control circuit that includes: a first high side switch and a first low side switch each connected to one end of a drive coil of a brush-less motor; and a second high side switch and a second low side switch each connected to the other end of the drive coil, in which the motor control circuit rotationally drives the brush-less motor by switching the first high side switch, the first low side switch, the second high side switch, and the second low side switch to a conduction state or a cut-off state, and the motor control circuit has: a first energization state in which the first high side switch and the second low side switch are switched to a conduction state and the second high side switch and the first low side switch are switched to a cut-off state to supply drive current in the positive direction to the drive coil; a second energization state in which the first high side switch and the second low side switch are switched to a cut-off state and the second high side switch and the first low side switch are switched to a conduction state to supply drive current in the negative direction to the drive coil; a first reflux state in which, after the first energization state, the first high side switch and the second high side switch are switched to a cut-off state and at least the second low side switch out of the first low side switch and the second low side switch is switched to a conduction state or the first low side switch and the second low side switch are switched to a cut-off state and at least the first high side switch out of the first high side switch and the second high side switch is switched to a conduction state, to apply circulation current to the drive coil; a second reflux state in which, after the second energization state, the first high side switch and the second high side switch are switched to a cut-off state and at least the first low side switch out of the first low side switch and the second low side switch is switched to a conduction state or the first low side switch and the second low side switch are switched to a cut-off state and at least the second high side switch out of the first high side switch and the second high side switch is switched to a conduction state, to apply circulation current to the drive coil; a first non-energization state in which at least three switches including switches that have been in a cut-off state in the first reflux state out of the first high side switch, the first low side switch, the second high side switch, and the second low side switch are switched to a cut-off state between the first reflux state and the second energization state after the first reflux state; and a second non-energization state in which at least three switches including switches that have been in a cut-off state in the second reflux state out of the first high side switch, the first low side switch, the second high side switch, and the second low side switch are switched to a cut-off state between the second reflux state and the first energization state after the second reflux state.

An embodiment of the present disclosure is the motor control circuit described above, in which the first high side switch and the second high side switch are switched to a cut-off state and the first low side switch and the second low side switch are switched to a conduction state to apply circulation current to the drive coil in the first reflux state and the second reflux state, and the first high side switch, the first low side switch, the second high side switch, and the second low side switch are switched to a cut-off state in the first non-energization state and the second non-energization state.

An embodiment of the present disclosure is the motor control circuit described above, in which the reflux state is switched to the non-energization state at a switching timing predetermined based on a timing in which the amount of the circulation current flowing in the reflux state of the brush-less motor in a low load state is reduced.

An embodiment of the present disclosure is the motor control circuit described above, in which the reflux state is switched to the non-energization state at a second switching timing predetermined based on a timing in which the amount of the circulation current flowing in the reflux state of the brush-less motor in a high load state is reduced.

An embodiment of the present disclosure is the motor control circuit described above that further includes a current detector for detecting the circulation current, in which the reflux state is switched to the non-energization state based on a timing in which the amount of the circulation current detected by the current detector is reduced.

An embodiment of the present disclosure is the motor control circuit described above, in which the current detector detects current flowing in the first low side switch and current flowing in the second low side switch.

An embodiment of the present disclosure is a motor including the motor control circuit described above and a brush-less motor driven by the motor control circuit.

According to the present disclosure, a motor control circuit and a motor that reduce generation of so-called minus torque and improve efficiency of a brush-less motor can be provided.

BRIEF DESCRIPTION OF THE DRAWINGS

FIG. 3 shows an example of a reflux state continuous electrical angle according to the present embodiment;

DESCRIPTION OF THE EMBODIMENTS

Hereinafter, the embodiments of the present disclosure will be described with reference to the drawings.

Figure 1:
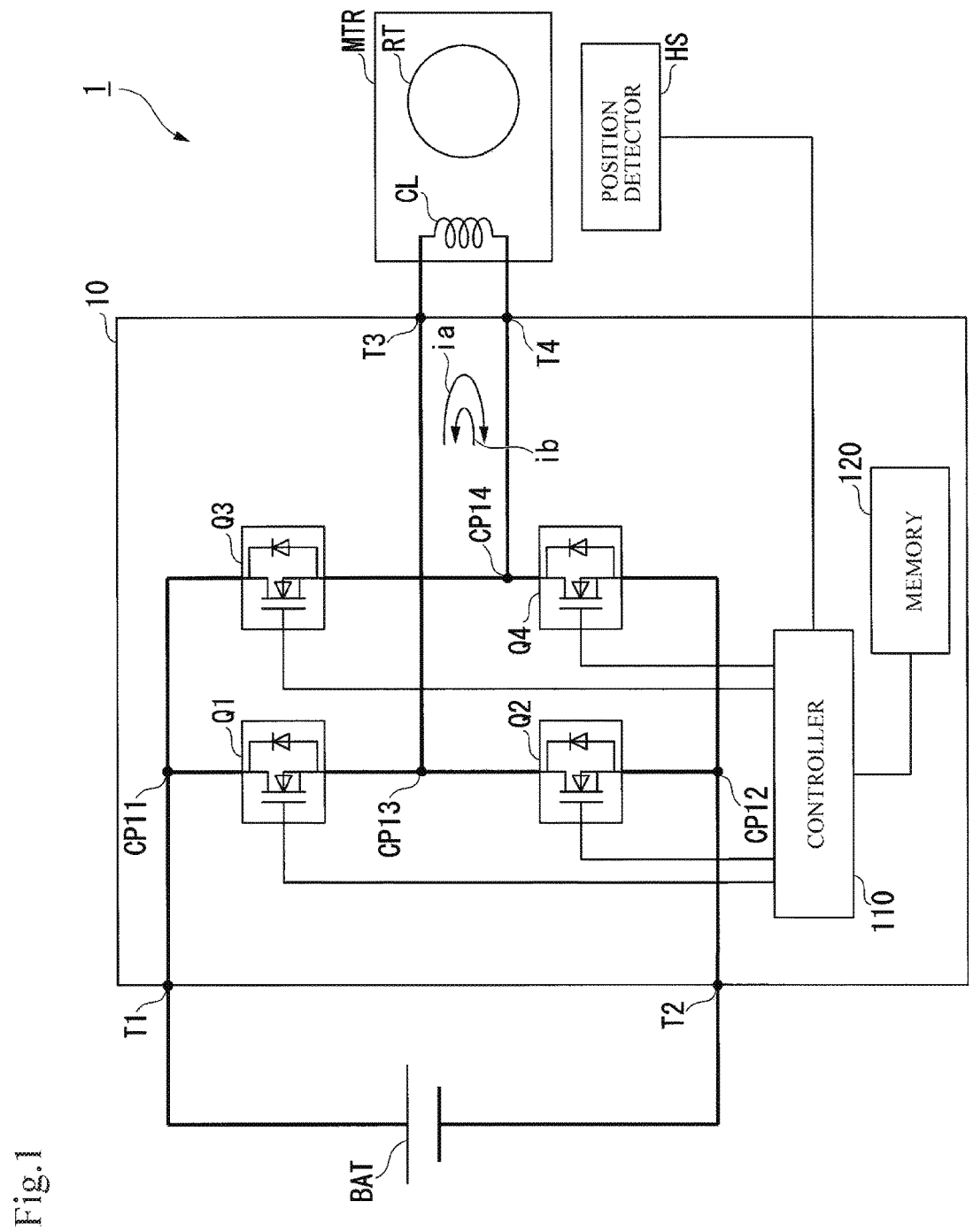
FIG. 1 illustrates an example of a configuration of a motor according to the present embodiment.

FIG. 1 illustrates an example of a configuration of a motor 1 according to the present embodiment. For example, the motor 1 is provided to an electrical device such as a vacuum cleaner and an electrical screwdriver, especially, a portable electrical device. The motor 1 includes a brush-less motor MTR, a position detector HS, a battery BAT, and a motor control circuit 10.

The brush-less motor MTR includes a rotor RT and a drive coil CL. The brush-less motor MTR is a single-phase brush-less motor, for example. The brush-less motor MTR rotates the rotor RT by suction force or repulsive force which is generated by magnetic force due to current supplied to the drive coil CL and magnetic force of permanent magnet provided to the rotor RT.

The position detector HS includes a magnetic sensor such as a hall effect sensor for example, and detects a rotation position (for example, an electrical angle) of the rotor RT. The position detector HS outputs rotation position information indicating the detected rotation position of the rotor RT to the motor control circuit 10.

The battery BAT is a secondary battery such as a nickel-cadmium battery and a lithium-ion battery, and supplies electrical power to the motor control circuit 10. Note that, the battery BAT is not limited to secondary battery and may be a primary battery such as a dry-cell battery.

The motor control circuit 10 rotates the rotor RT by supplying the electrical power supplied from the battery BAT to the drive coil CL. The motor control circuit 10 rotates the rotor RT in one direction by changing the direction of the current supplied to the drive coil CL in accordance with the rotation position information of the rotor RT output from the position detector HS. Hereinafter, more specific configuration of the motor control circuit 10 will be described.

[Configuration of Motor Control Circuit 10]

The motor control circuit 10 includes terminals T1 to T4. The terminal T1 is connected to the positive electrode of the battery BAT. The terminal T2 is connected to the negative electrode of the battery BAT. The terminal T3 is connected to one end of the drive coil CL of the brush-less motor MTR. The terminal T4 is connected to the other end of the drive coil CL.

In addition, the motor control circuit 10 includes a first high side switch Q1, a first low side switch Q2, a second high side switch Q3, and a second low side switch Q4. The first high side switch Q1 is connected between a connecting point CP11 and a connecting point CP13 in the motor control circuit 10. The first low side switch Q2 is connected between the connecting point CP13 and a connecting point CP12. The second high side switch Q3 is connected between the connecting point CP11 and a connecting point CP14. The second low side switch Q4 is connected between the connecting point CP14 and the connecting point CP12. Note that, in the following description, these four switches are collectively referred to as switches Q when they are not individually mentioned. These switches Q form so-called H bridge.

Moreover, the motor control circuit 10 includes a controller 110 and a memory 120. The memory 120 preliminarily stores programs and data for control by the controller 110.

The controller 110 switches each switch Q described above to an ON state (conduction state) or an OFF state (cut-off state) on the basis of rotation position information of the rotor RT detected by the position detector HS.

For example, when both the first high side switch Q1 and the second low side switch Q4 are in an ON state and both the first low side switch Q2 and the second high side switch Q3 are in an OFF state, drive current ia departing from the terminal T3 and returning to the terminal T4 via the drive coil CL flows. The drive current ia is also referred to as drive current in the positive direction.

In addition, for example, when both the first high side switch Q1 and the second low side switch Q4 are in an OFF state and both the first low side switch Q2 and the second high side switch Q3 are in an ON state, drive current ib flows from the terminal T4 to the terminal T3 via the drive coil CL. The drive current ib is also referred to as drive current in the negative direction.

Hereinafter, control state of the switches Q by the controller 110 will be described with reference to FIG. 2.

[Control State]

Figure 2:
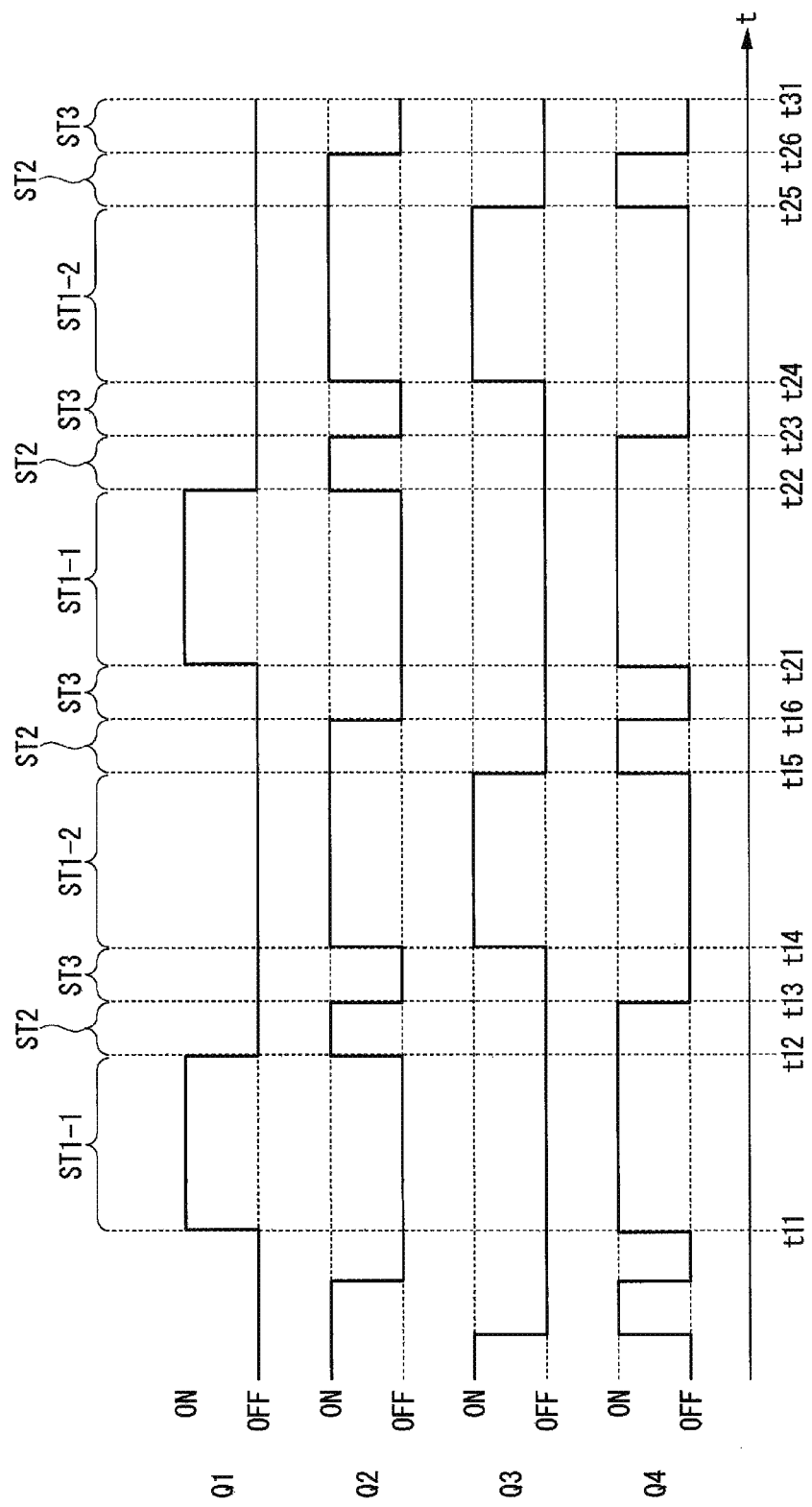
FIG. 2 illustrates an example of a control state of a switch by a controller according to the present embodiment.

FIG. 2 illustrates one example of control state of the switches Q by the controller 110 according to the present embodiment. The control state of the switches Q by the controller 110 is classified into (1) driving state, (2) reflux state, and (3) non-energization state.

(1) Driving State

The driving state refers to a state in which drive current is supplied from the battery BAT to the drive coil CL to apply rotational force to the rotor RT. The driving state includes a state in which the drive current ia (drive current in the positive direction) described above flows and a state in which the drive current ib (drive current in the negative direction) described above flows. In the following description, the state in which the drive current ia flows is also referred to as first driving state ST1-1 and the state in which the drive current ib flows is also referred to as second driving state ST1-2.

In the example illustrated in FIG. 2, the period between time t11 and time t12 and the period between time t21 and time t22 are the first driving state ST1-1. In addition, in the example illustrated in FIG. 2, the period between time t14 and time t15 and the period between time t24 and time t25 show the second driving state ST1-2.

(2) Reflux State

The reflux state ST2 refers to a state in which circulation current is applied to the drive coil CL without supplying drive current from the battery BAT to the drive coil CL. In the reflux state ST2, the controller 110 switches both the first high side switch Q1 and the second high side switch Q3 to an OFF state and switches both the first low side switch Q2 and the second low side switch Q4 to an ON state.

In the example illustrated in FIG. 2, the period between time t12 and time t13, the period between time t15 and time t16, the period between time t22 and time t23, and the period between time t25 and time t26 show the reflux state ST2.

In the driving states described above (the first driving state ST1-1 and the second driving state ST1-2), when drive current is supplied to the drive coil CL, energy is stored in the drive coil CL by its inductance.

Here, when the state is switched to the reflux state ST2 after the first driving state ST1-1, a reflux circuit departing from the connecting point CP13 and returning to the connecting point CP13 via the terminal T3, the drive coil CL, the terminal T4, the connecting point CP14, the second low side switch Q4, the connecting point CP12, and the first low side switch Q2 is formed since both the first low side switch Q2 and the second low side switch Q4 are switched to an ON state. When the reflux circuit is formed, circulation current is generated by the energy stored in the drive coil CL. The direction in which the circulation current flows is the same direction as the drive current is in the first driving state ST1-1. Rotational force is generated in the rotor RT by the circulation current.

Note that, when the state is switched to the reflux state ST2 after the second driving state ST1-2, circulation current flowing in the same direction as the drive current ib in the second driving state ST1-2 is generated. Also in this case, rotational force is generated in the rotor RT by the circulation current.

Since the motor control circuit 10 has the reflux state ST2 after the driving state, it can apply rotational force to the rotor RT without supplying drive current from the battery BAT. That is, the motor control circuit 10 can reduce power consumption of the battery BAT.

Note that, while a case in which both the first low side switch Q2 and the second low side switch Q4 are switched to an ON state in the reflux state ST2 is described as the specific example of the present embodiment, the present disclosure is not limited thereto. There are parasitic diodes in the first low side switch Q2 and in the second low side switch Q4. The parasitic diode of the first low side switch Q2 can apply current in the direction from the connecting point CP12 to the connecting point CP13. In addition, the parasitic diode of the second low side switch Q4 can apply current in the direction from the connecting point CP12 to the connecting point CP14. Therefore, when circulation current is applied in the same direction as the drive current ia, circulation current flows even if the first low side switch Q2 is in an OFF state if the second low side switch Q4 is in an ON state. In addition, when circulation current is applied in the same direction as the drive current ib, circulation current flows even if the second low side switch Q4 is in an OFF state if the first low side switch Q2 is in an ON state. That is, in the reflux state ST2, circulation current can be applied if one of the first low side switch Q2 and the second low side switch Q4 is in an ON state according to the direction of the circulation current.

Note that, while a case in which both the first high side switch Q1 and the second high side switch Q3 are in an OFF state in the reflux state ST2, that is, a case in which the first low side switch Q2 and the second low side switch Q4 are used as reflux circuits, will be described as the specific example of the present embodiment, the present disclosure is not limited thereto.

In the reflux state ST2, the first high side switch Q1 and the second high side switch Q3 may be used as reflux circuits without using the first low side switch Q2 and the second low side switch Q4 as reflux circuits. In this case, both the first high side switch Q1 and the second high side switch Q3 are switched to an ON state. In addition, if parasitic diodes in the first high side switch Q1 and the second high side switch Q3 are used as reflux circuits, only one of the first high side switch Q1 and the second high side switch Q3 may be switched to an ON state.

(3) Non-Energization State

The Non-energization state ST3 is a state in which each switch Q is switched to an OFF state after the reflux state ST2.

In an example illustrated in FIG. 2, the period between time t13 and time t14, the period between time t16 and time t21, the period between time t23 and time t24, and the period between time t26 and time t31 show the non-energization state ST3.

As described above, circulation current is generated by the energy stored in the drive coil CL in the driving state. The energy stored in the drive coil CL is consumed by generating circulation current. Here, inverse electromotive force by rotation of the rotor RT is generated in the drive coil CL. When the energy stored in the drive coil CL is consumed to the level where circulation current cannot be generated, current flows in the drive coil CL by the inverse electromotive force described above in the direction opposite to the circulation current. When the current in the opposite direction flows in the drive coil CL, brake force that is, minus torque, is generated in the rotor RT. Since the minus torque can be a factor of reduced efficiency of the brush-less motor MTR, it is desirable that the minus torque is not generated.

Then, the controller 110 according to the present embodiment has the non-energization state ST3 after the reflux state ST2. With the non-energization state ST3, the controller 110 inhibits current in the direction opposite to circulation current from flowing in the drive coil CL and reduces occurrence of minus torque. Hereinafter, switching from the reflux state ST2 to the non-energization state ST3 by the controller 110 will be described.

Note that, a case in which each switch Q is switched to the OFF state in the non-energization state ST3 will be described as the specific example of the present embodiment, the present disclosure is not limited thereto.

In the non-energization state ST3, as long as current in the direction that inhibits rotation of the rotor RT (current generating minus torque) does not flow in the drive coil CL, any one switch Q may be switched to an ON state.

For example, in an example illustrated in FIG. 2, when the state becomes the non-energization state ST3 from the first driving state ST1-1 via the reflux state ST2, current generating minus torque does not flow even if the second low side switch Q4 is in an ON state as long as the first low side switch Q2 is in an OFF state. That is, when the non-energization state ST3 in which the state becomes the non-energization state ST3 from the first driving state ST1-1 via the reflux state ST2 is referred to as "first non-energization state ST3-1," the second low side switch Q4 may be switched to the ON state in the first non-energization state ST3-1.

In addition, in an example illustrated in FIG. 2, when the state becomes the non-energization state ST3 from the second driving state ST1-2 via the reflux state ST2, minus torque current does not flow even if the first low side switch Q2 is in an ON state as long as the second low side switch Q4 is in an OFF state. That is, when the non-energization state ST3 in which the state becomes the non-energization state ST3 from the second driving state ST1-2 via the reflux state ST2 is referred to as "second non-energization state ST3-2," the first low side switch Q2 may be switched to an ON state in the second non-energization state ST3-2.

Note that, when a parasitic diode is used for a reflux circuit, switching from the reflux state ST2 to the first non-energization state ST3-1 and switching from the reflux state ST2 to the second non-energization state ST3-2 occur by disappearance of circulation current. That is, in this case, an ON state/OFF state of each switch Q is not changed in switching from the reflux state ST2 to the first non-energization state ST3-1 and switching from the reflux state ST2 to the second non-energization state ST3-2.

[Switching from the Reflux State to the Non-Energization State]

The controller 110 may switch the state from the reflux state ST2 to the non-energization state ST3 based on (1) the predetermined timing and (2) the result of detection of circulation current. These will be described below in series.

(1) Switching Based on the Predetermined Timing

The controller 110 switches the state from the reflux state ST2 to the non-energization state ST3 based on the predetermined timing. In this case, the controller 110 switches the state from the reflux state ST2 to the non-energization state ST3 at the timing when a change of angle occurs to the rotor RT by the predetermined reflux state continuous electrical angle after the state has changed from the driving state to the reflux state ST2. For example, the reflux state continuous electrical angle is determined based on the result of experiment of rotation of the rotor RT when the brush-less motor MTR is incorporated in a product such as a vacuum cleaner. An example of the reflux state continuous electrical angle is shown in FIG. 3.

FIG. 3 shows an example of the reflux state continuous electrical angle according to the present embodiment. In the driving state, energy stored in the drive coil CL heavily depends on the amount of drive current. That is, the time in which the drive coil CL can continuously apply circulation current depends on the amount of the drive current, that is, the load state of the brush-less motor MTR. The time in which the drive coil CL can continuously apply circulation current, that is, the limit time until generation of minus torque, is obtained by experiment, and the relation between the load state and the reflux state continuous electrical angle shown in FIG. 3 is obtained based on the relation between the obtained time and the number of rotation of the rotor RT. For example, the reflux state continuous electrical angle a_high when the brush-less motor MTR is in a high load state is larger than a reflux state continuous electrical angle a_low when that is in a low load state.

(1-1) Switching Based on Result of Measurement of High Load State

The memory 120 stores the reflux state continuous electrical angle a_high. The controller 110 switches the state from the reflux state ST2 to the non-energization state ST3 based on the reflux state continuous electrical angle a_high. Specifically, the controller 110 measures duration of the reflux state ST2 after the state has been switched from the driving state to the reflux state ST2. The controller 110 calculates the amount of change of electrical angle while the reflux state ST2 continues. The controller 110 switches the state from the reflux state ST2 to the non-energization state ST3 at the timing when the amount of change of electrical angle while the reflux state ST2 continues reaches the reflux state continuous electrical angle a_high.

Note that, the controller 110 may calculate time to continue the reflux state based on the reflux state continuous electrical angle a_low and the number of rotation of the rotor RT. In this case, the controller 110 switches the state from the reflux state ST2 to the non-energization state ST3 at the timing when duration of the measured reflux state ST2 reaches the calculated time.

(1-2) Switching Based on Result of Measurement of Low Load State

The memory 120 stores the reflux state continuous electrical angle a_low. The controller 110 switches the state from the reflux state ST2 to the non-energization state ST3 based on the reflux state continuous electrical angle a_low. Specifically, the controller 110 measures the duration of the reflux state ST2 after switching the state from the driving state to the reflux state ST2. The controller 110 calculates the amount of change of electrical angle while the reflux state ST2 continues. The controller 110 switches the state from the reflux state ST2 to the non-energization state ST3 at the timing when the amount of change of electrical angle while the reflux state ST2 continues reaches the reflux state continuous electrical angle a_low.

Note that, the controller 110 may calculate time to continue the reflux state based on the reflux state continuous electrical angle a_high and the number of rotation of the rotor RT as in the case of the reflux state continuous electrical angle a_high. In this case, the controller 110 switches the state from the reflux state ST2 to the non-energization state ST3 at the timing when the duration of the reflux state ST2 measured reaches the calculated time.

Here, generation of load of the brush-less motor MTR may be different depending on the type of electrical device in which the brush-less motor MTR is incorporated.

For example, in a case in which the electrical device including the brush-less motor MTR is an electrical screwdriver, load is higher when it is tightening a screw or bolt than when it is running idle without screwing. That is, in case of electrical screwdriver, load is higher when it is working than when it is running idle. In this case, the controller 110 switches the state based on the reflux state continuous electrical angle a_high of high load state. With such a configuration, the reflux state ST2 becomes longer than when the controller 110 switches the state based on the reflux state continuous electrical angle a_low, and circulation current can be used effectively.

On the other hand, if the electrical device including the brush-less motor MTR is a vacuum cleaner, load is sometimes lower when it is vacuuming with its inlet contact with the floor and the like than when it is vacuuming in the air, depending on the shape of air intake fan. For example, if the shape of air intake fan of the vacuum cleaner is oblique flow fan, load is lower when it is working than it is running idle. In this case, the controller 110 switches the state based on the reflux state continuous electrical angle a_low in the low load state.

Here, a case in which the state is switched based on the reflux state continuous electrical angle a_high of the high load state when the load is lower when it is working than when it is running idle such as a vacuum cleaner will be described. As described above, the reflux state continuous electrical angle a_high is longer than the reflux state continuous electrical angle a_low. Since the energy stored in the drive coil CL is less when the brush-less motor MTR is low load than when it is high load, minus torque is more likely to occur if the reflux state ST2 is kept for longer time. Therefore, if the reflux state ST2 is kept by the reflux state continuous electrical angle a_high of the high load when the brush-less motor MTR is low load, minus torque is more likely to occur. That is, in case of an electrical device with lower load when it is working than when it is running idle such as a vacuum cleaner, if the reflux state ST2 is kept by the reflux state continuous electrical angle a_high of the high load, minus torque is less likely to occur when it is running idle and minus torque is more likely to occur when it is working.

Then, in case of an electrical device with lower load when it is working than it is running idle such as a vacuum cleaner, the controller 110 according to the present embodiment inhibits generation of minus torque when it is working, by switching the state to the non-energization state ST3 based on the reflux state continuous electrical angle a_low in the low load state.

In this example, the reflux state continuous electrical angle (such as the reflux state continuous electrical angle a_high and the reflux state continuous electrical angle a_low) described above is stored in the memory 120. For example, if the brush-less motor MTR is incorporated in an electrical screwdriver, the memory 120 stores the reflux state continuous electrical angle a_high. In addition, if the brush-less motor MTR is incorporated in a vacuum cleaner, the memory 120 stores the reflux state continuous electrical angle a_low.

The controller 110 switches the state from the reflux state ST2 to the non-energization state ST3 based on the reflux state continuous electrical angle stored in the memory 120.

(2) Switching Based on Result of Detection of Circulation Current

A case in which the controller 110 switches the state from the reflux state ST2 to the non-energization state ST3 based on the predetermined timing (for example, the reflux state continuous electrical angle stored in the memory 120) has been described. Hereinafter, a case in which the controller 110 switches the state from the reflux state ST2 to the non-energization state ST3 based on result of detection of circulation current will be described with reference to FIG. 4.

Figure 4:
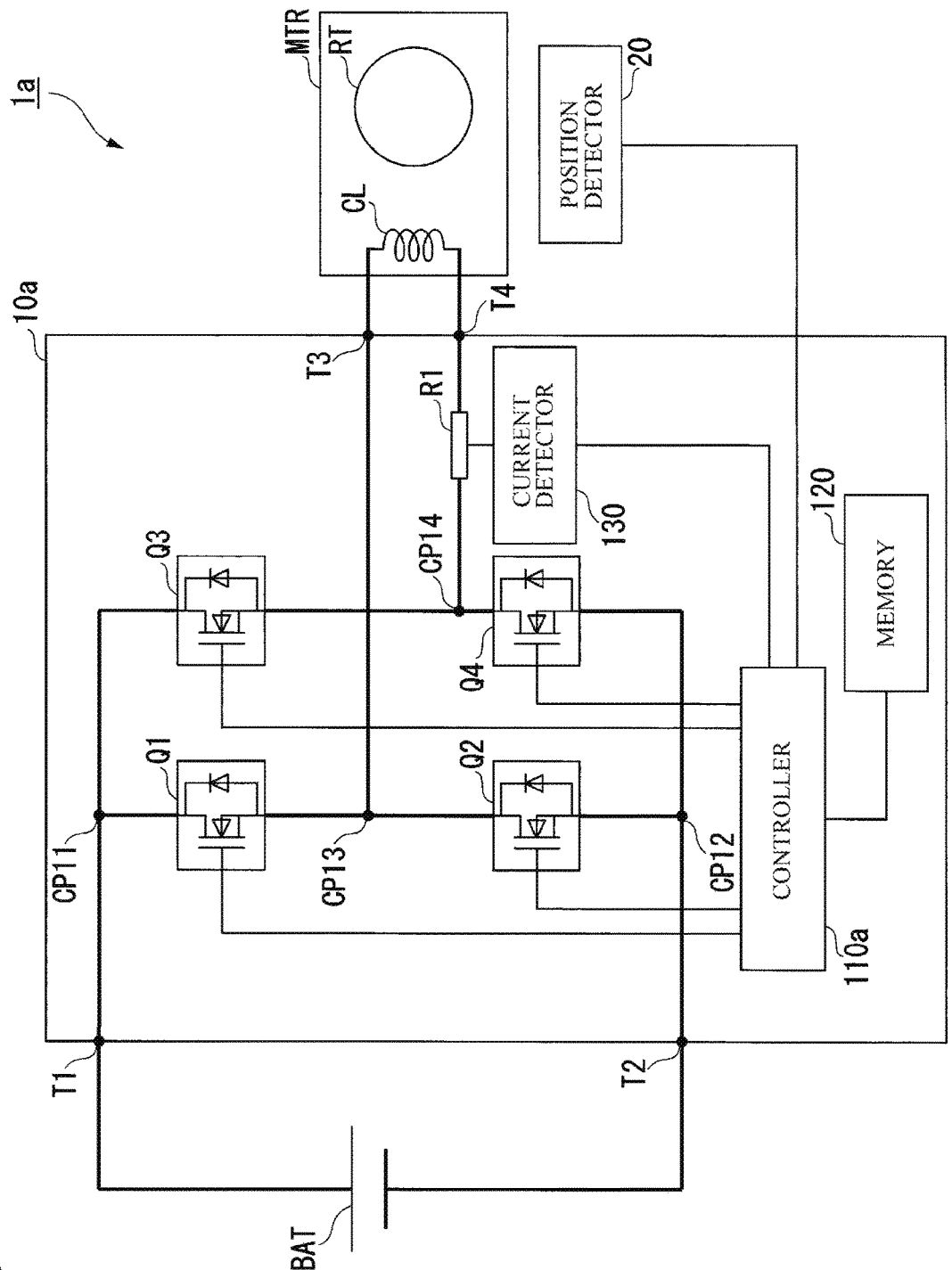
FIG. 4 illustrates an example of a configuration of a motor control circuit including a current detector according to the present embodiment.

FIG. 4 illustrates an example of a configuration of a motor control circuit 10a including a current detector 130 according to the present embodiment. The motor control circuit 10a is different from the motor control circuit 10 described above in that it has a shunt resistance R1 and the current detector 130. Note that, the same configurations as those of the motor control circuit 10 described above are given the same reference signs and description thereof will be omitted.

The shunt resistance R1 is connected between a terminal T4 and the connecting point CP14. The current flowing between the terminal T4 and the connecting point CP14 (for example, circulation current) flows in the shunt resistance R1. The current detector 130 detects the current flowing in the shunt resistance R1 by detecting the electrical potential difference between both ends of the shunt resistance R1.

The controller 110a determines the amount of the current detected by the current detector 130 in the reflux state ST2, that is, the amount of the circulation current. The controller 110a switches the state from the reflux state ST2 to the non-energization state ST3 when the amount of the circulation current detected by the current detector 130 is reduced, for example, when it is reduced to nearly zero.

With such a configuration, the motor control circuit 10a can detect the timing at which minus torque is generated without regard to the load state of the brush-less motor MTR. That is, the motor control circuit 10a can determine the timing to switch the state from the reflux state ST2 to the non-energization state ST3 without regard to the load state of the brush-less motor MTR. In addition, the motor control circuit 10a can more effectively use circulation current in case of electrical device with lower load when it is working than when it is running idle such as a vacuum cleaner as described above than in case of switching the control state at the predetermined timing.

Note that, while the shunt resistance R1 is connected between the terminal T4 and the connecting point CP14 in the example described above, the present disclosure is not limited thereto, and the shunt resistance R1 may be connected to any position in the reflux circuit.

(3) Switching Based on Result of Detection of Drive Current

If the value of inductance of the drive coil CL is known, the controller 110 may calculate the duration of the reflux state ST2 by calculating the energy stored in the drive coil CL by drive current. In this case, the memory 120 stores the value of inductance of the drive coil CL. The controller 110 calculates the energy stored in the drive coil CL based on the value of drive current immediately before the state is switched from the driving state (the first driving state ST1-1 and the second driving state ST1-2) described above to the reflux state ST2 and the value of inductance stored in the memory 120.

As an example, when there is a shunt resistance in a path where drive current flows, the controller 110 calculates the value of drive current based on the electrical potential difference between both ends of the shunt resistance. For example, a shunt resistance (not illustrated) may be provided between the terminal T2 and the connecting point CP12 as a path where drive current flows. In this case, the controller 110 calculates the value of drive current based on the electrical potential difference between both ends of the shunt resistance immediately before the state is switched from the driving state to the reflux state ST2. The controller 110 calculates the energy stored in the drive coil CL immediately before the state is switched from the driving state to the reflux state ST2 based on the calculated value of drive current and the value of inductance of the drive coil CL. The controller 110 calculates duration of the reflux state ST2 based on the calculated energy.

[Modification]

Figure 5:
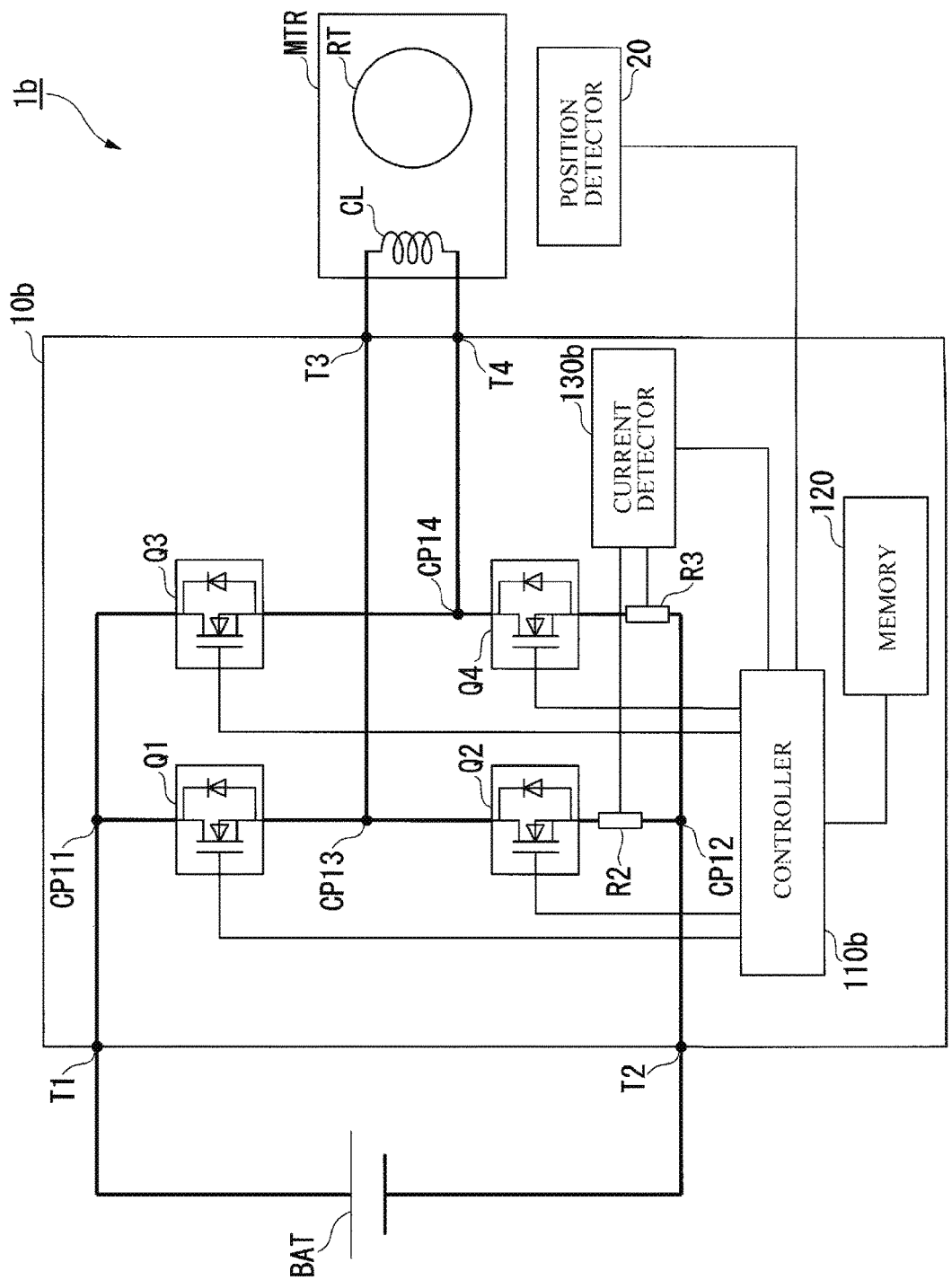
FIG. 5 illustrates a modification of the configuration of the motor control circuit including the current detector according to the present embodiment.

FIG. 5 illustrates an example of a configuration of a motor control circuit 10b including a current detector 130b according to the present embodiment. The motor control circuit 10b is different from the motor control circuit 10 and the motor control circuit 10a described above in that it has a shunt resistance R2, a shunt resistance R3, and a current detector 130b. Note that, the same configurations as those of the motor control circuit 10 described above are given the same reference signs and description thereof will be omitted.

The shunt resistance R2 is connected between the first low side switch Q2 and the connecting point CP12. The shunt resistance R3 is connected between the second low side switch Q4 and the connecting point CP12.

The current detector 130b detects current flowing in the shunt resistance R2 by detects electrical potential difference between both ends of the shunt resistance R2. In addition, the current detector 130b detects current flowing in the shunt resistance R3 by detecting electrical potential difference between both ends of the shunt resistance R3.

The controller 110b determines the amount of the current detected by the current detector 130b in the reflux state ST2, that is, the amount of the circulation current. Here, the controller 110b may determine the amount of the current flowing in the shunt resistance R2 or the current flowing in the shunt resistance R3 as the amount of the circulation current. The controller 110b switches the state from the reflux state ST2 to the non-energization state ST3 when the amount of the circulation current detected by the current detector 130 is reduced, for example, when it is reduced to nearly zero.

With the configuration illustrated in FIG. 5, the motor control circuit 10b can detect over current that flows when both the first high side switch Q1 and the first low side switch Q2 are in an ON state by the shunt resistance R2. In addition, the motor control circuit 10b can detect over current that flows when both the second high side switch Q3 and the second low side switch Q4 are in the ON state by the shunt resistance R3.

Since the shunt resistance R2 and the shunt resistance R3 are connected in the reflux circuit, circulation current can be detected by the shunt resistance R2 and the shunt resistance R3.

A known shunt resistance for detecting current is connected between the connecting point CP12 and the terminal T2, for example. Since the shunt resistance is connected outside the reflux circuit according to a known method, it has been necessary to connect a shunt resistance for detecting circulation current in addition to a shunt resistance for detecting current in order to detect the circulation current.

On the other hand, the motor control circuit 10b can provide the shunt resistance R2 and the shunt resistance R3 with two functions to detect circulation current and over current.

Note that, the position where the shunt resistance R2 and the shunt resistance R3 are connected is not limited to the position described above, and it is only necessary that they are provided to the position in the reflux circuit where they can also detect over current.

In addition, while an example in which a shunt resistance is used for detecting circulation current in the motor control circuit 10a and the motor control circuit 10b has been described, the present disclosure is not limited thereto and the current detector 130 and the current detector 130b may detect circulation current without a shunt resistance. For example, the current detector 130 and the current detector 130b may detect circulation current by detecting electrical potential difference between the source terminal and the drain terminal of the first low side switch Q2 or electrical potential difference between the source terminal and the drain terminal of the second low side switch Q4. In addition, the current detector 130 and the current detector 130b may detect circulation current by known means other than detecting electrical potential difference between terminals of shunt resistance or switch.

While the embodiments of the present disclosure have been described in detail with reference to the drawings, the specific configurations are not limited to these embodiments and may be modified without departing the spirit of the present disclosure.

Note that, each device described above includes a computer. Each process of each device described above is stored in a computer-readable storage medium in the form of a program, and the above processes are carried out by reading and executing the program by the computer. Here, a computer-readable storage medium includes magnetic disk, magnetic optical disk, CD-ROM, DVD-ROM, and semiconductor memory. In addition, a computer program may be distributed to a computer via a communication line and such a computer may execute such a program.

In addition, the program described above may realize a part of the functions described above. Moreover, the program described above may be one that can realize the functions described above in combination with a program already stored in a computer system, that is, a difference file (difference program).

What is claimed is:
1. A motor control circuit comprising:
    a first high side switch and a first low side switch each connected to one end of a drive coil of a brush-less motor; and
    a second high side switch and a second low side switch each connected to the other end of the drive coil, wherein
    the motor control circuit rotationally drives the brush-less motor by switching the first high side switch, the first low side switch, the second high side switch, and the second low side switch to a conduction state or a cut-off state, and
    the motor control circuit has:
    a first energization state in which the first high side switch and the second low side switch are switched to a conduction state and the second high side switch and the first low side switch are switched to a cut-off state to supply drive current in the positive direction to the drive coil;
    a second energization state in which the first high side switch and the second low side switch are switched to a cut-off state and the second high side switch and the first low side switch are switched to a conduction state to supply drive current in the negative direction to the drive coil;
    a first reflux state in which, after the first energization state, the first high side switch and the second high side switch are switched to a cut-off state and at least the second low side switch out of the first low side switch and the second low side switch is switched to a conduction state or the first low side switch and the second low side switch are switched to a cut-off state and at least the first high side switch out of the first high side switch and the second high side switch is switched to a conduction state, to apply circulation current in the positive direction to the drive coil;
    a second reflux state in which, after the second energization state, the first high side switch and the second high side switch are switched to a cut-off state and at least the first low side switch out of the first low side switch and the second low side switch is switched to a conduction state or the first low side switch and the second low side switch are switched to a cut-off state and at least the second high side switch out of the first high side switch and the second high side switch is switched to a conduction state, to apply circulation current in the negative direction to the drive coil;
    a first non-energization state in which at least three switches including switches that have been in a cut-off state in the first reflux state out of the first high side switch, the first low side switch, the second high side switch, and the second low side switch are switched to a cut-off state between the first reflux state and the second energization state after the first reflux state; and
    a second non-energization state in which at least three switches including switches that have been in a cut-off state in the second reflux state out of the first high side switch, the first low side switch, the second high side switch, and the second low side switch are switched to a cut-off state between the second reflux state and the first energization state after the second reflux state.

2. The motor control circuit according to claim 1, wherein
    the first high side switch and the second high side switch are switched to a cut-off state and the first low side switch and the second low side switch are switched to a conduction state to apply circulation current to the drive coil in the first reflux state and the second reflux state, and
    the first high side switch, the first low side switch, the second high side switch, and the second low side switch are switched to a cut-off state in the first non-energization state and the second non-energization state.

3. The motor control circuit according to claim 1, wherein the first reflux state is switched to the first non-energization state and the second reflux state is switched to the second non-energization state at a switching timing predetermined based on a timing in which the amount of the circulation current flowing in the reflux state of the brush-less motor in a low load state is reduced.

4. The motor control circuit according to claim 1, wherein the first reflux state is switched to the first non-energization state and the second reflux state is switched to the second non-energization state at a second switching timing predetermined based on a timing in which the amount of the circulation current flowing in the reflux state of the brush-less motor in a high load state is reduced.

5. The motor control circuit according to claim 1, further comprising a current detector for detecting the circulation current, wherein
the first reflux state is switched to the first non-energization state and the second reflux state is switched to the second non-energization state based on a timing in which the amount of the circulation current detected by the current detector is reduced.

6. The motor control circuit according to claim 5, wherein the current detector detects current flowing in the first low side switch and current flowing in the second low side switch.

7. A motor comprising:
the motor control circuit according to claim 1; and
a brush-less motor driven by the motor control circuit.

* * * * *